Figure 1:
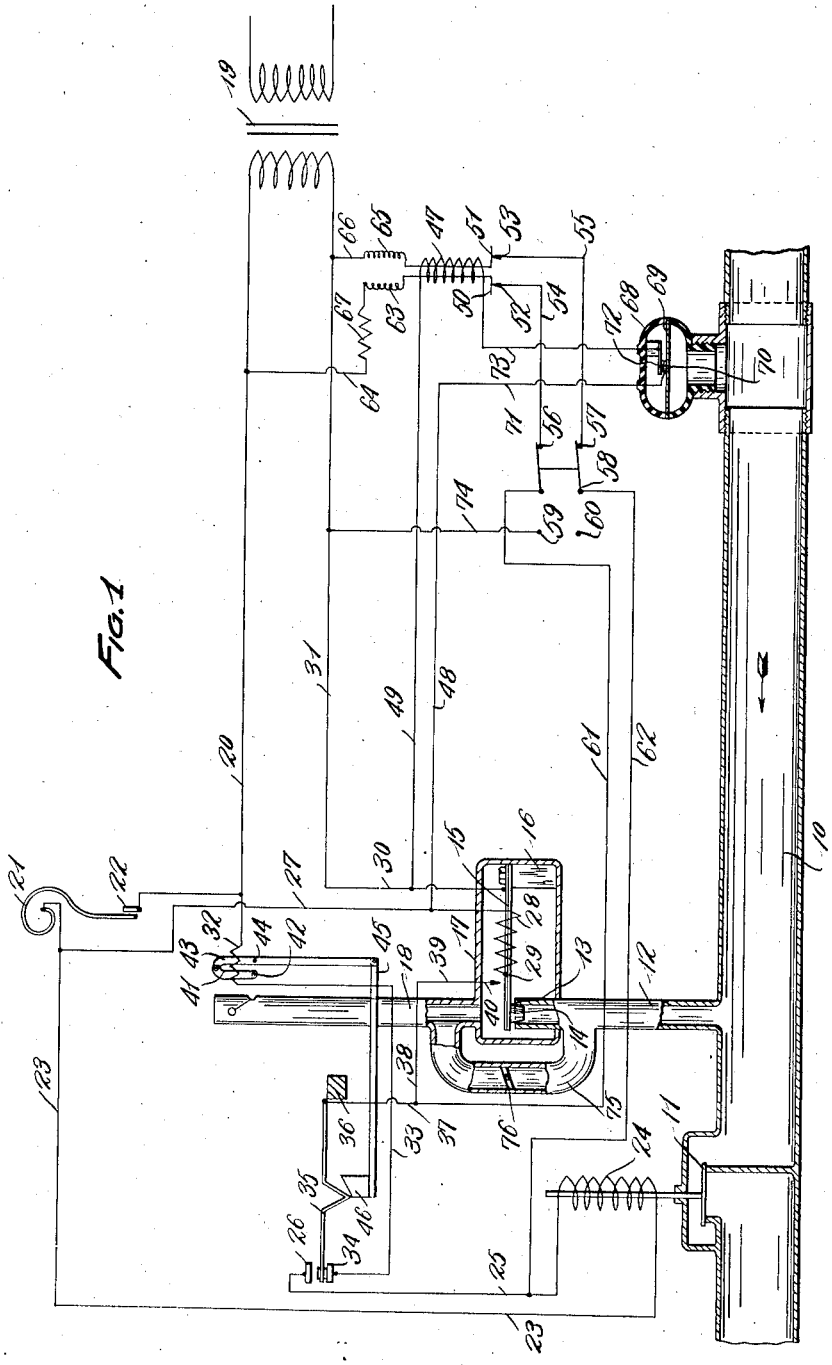

Jan. 20, 1942.   V. O. BEAM   2,270,722
AUTOMATIC IGNITION FOR FLUID BURNERS
Filed Oct. 1, 1938   2 Sheets-Sheet 1

INVENTOR.
VILYNN O. BEAM
BY
Kurs Hudson & Kent
ATTORNEYS

Jan. 20, 1942.   V. O. BEAM   2,270,722
AUTOMATIC IGNITION FOR FLUID BURNERS
Filed Oct. 1, 1938   2 Sheets-Sheet 2
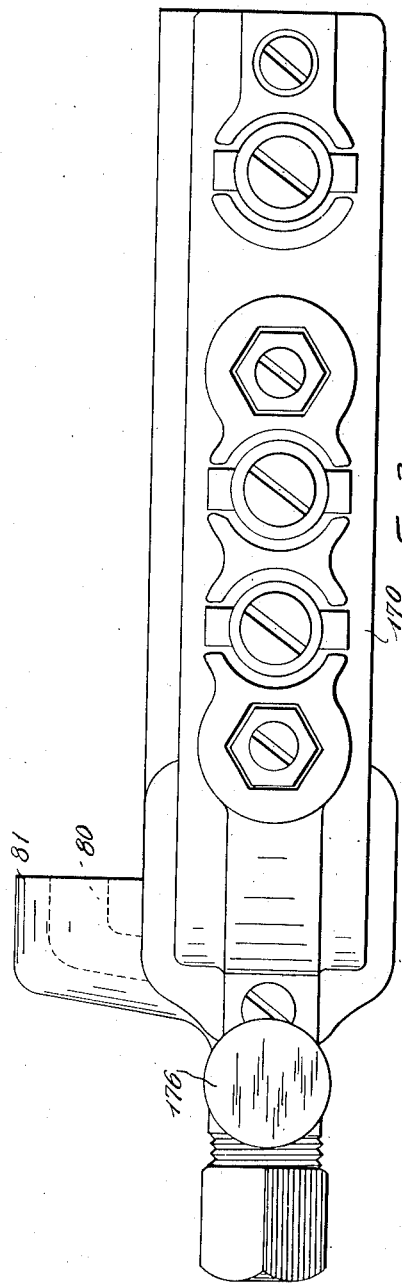
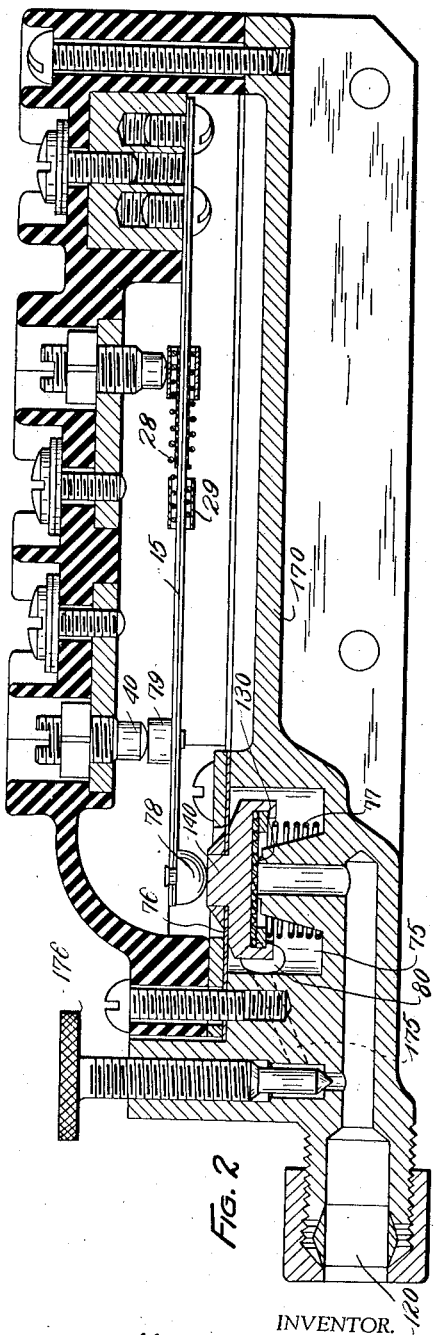
INVENTOR.
VILYNN O. BEAM
BY
ATTORNEYS Patented Jan. 20, 1942

2,270,722

UNITED STATES PATENT OFFICE 2,270,722

AUTOMATIC IGNITION FOR FLUID BURNERS

Vilynn O. Beam, Cleveland Heights, Ohio, assignor to The Bryant Heater Company, Cleveland, Ohio, a corporation of Ohio Application October 1, 1938, Serial No. 232,816

10 Claims. (Cl. 158—117.1)

This invention relates to improvements in automatic ignition for fluid burners, being intended primarily for gas burners in thermostatically controlled systems.

One of the objects of the invention is the provision of a system wherein all unsafe periods, however short and however improbable of occurrence, are eliminated.

Another object is the provision of means for preventing opening of the main fuel valve during any dangerous contingency.

More specifically, an object of the invention is the provision of an electric circuit which functions to disable the main valve motor during a brief period following the initiation of an "off" cycle, insuring a lighted and fully operative pilot before the fuel to the burner is turned on.

Another object is the provision of novel means for incapacitating the main valve motor when the pressure in the fuel line falls below a predetermined level and resetting the valve motor for operation when normal pressure is resumed.

Still another object is the provision of means for converting the system at will from one embodying a normally out pilot with automatic ignition and safety control to one embodying a continuously burning pilot with safety control, and vice versa.

Other objects and features of novelty will appear as I proceed with the description of that embodiment of the invention which, for the purposes of the present application, I have illustrated in the accompanying drawings, in which Fig. 1 is a diagrammatic view of my control system.

Figs. 2 and 3 are side and plan views, respectively, of apparatus which may be employed in connection with the invention.

In systems of the general character of that herein disclosed it has been proposed to provide a series or cycle of operations which must be performed each time the room thermostat calls for heat, these operations including the opening of the pilot valve, the energization of the electric igniter so as to provide a pilot flame, and the heating up of a thermostatic element to close a switch in the line of the valve motor, all of these things being accomplished in a predetermined order and requiring an appreciable amount of time, approximately two minutes in some cases. When after a period of burner operation the room thermostat ceases to call for heat the main fuel valve is closed at once, but again a certain amount of time must elapse before the control parts cool off sufficiently to return them to the normal position or condition in which they must be before the starting cycle may be again initiated. If during such off cycle period while the control elements are cooling, the room thermostat should be manually adjusted to again call for heat and to turn on the main burner before the pilot is lighted, fluid fuel may collect in the burner chamber to such an extent as to cause an explosion a little later when the pilot is ignited. The present invention is directed primarily to overcoming this contingency.

In the drawings, wherein the system is illustrated as applied to a gas burner, 10 indicates a fuel line in which there is a main valve 11 by which the flow of fuel to the burner is controlled. The pilot comprises a pipe 12 in which there is provided a valve seat 13 adapted to be closed by valve piece 14 that is mounted near the free end of a bi-metal thermostat strip 15 attached at its opposite end to a support 16, these parts being shown in the present instance as enclosed in a casing 17 from which the pilot pipe 18 extends.

The electrical part of the system may employ as its source of current the secondary of a stepdown transformer 19, which is preferably one of the constant current, high impedance type, although other transformers of the proper power rating may be used provided they are not of the constant voltage type. A conductor 20 extends from the transformer to one of the connections of a room thermostat 21, which may be of any known or customary character. As illustrated herein this thermostat is of the snap action type and has a single contact 22, these parts forming what will be hereinafter referred to as the first control switch. From thermostat 21 a conductor 23 leads to a valve operating motor 24, shown herein by way of example as a simple solenoid, the armature of which carries the valve 11. Other forms of valve motors may of course be substituted. A return conductor 25 connects with an upper contact 26 of a two-way switch, the upper part of which will be hereinafter referred to as the second control switch.

From conductor 23 another conductor 27 extends to a heating coil 28 which surrounds but is insulated from the bi-metal strip 15. At its extremity 29 however this coil is joined to the bi-metal strip. The fixed end of the latter is connected by conductors 30 and 31 with the return side of the transformer. Hence, when the thermostatic or first control switch is closed current flows through heating coil 28, which heats up the bi-metal strip 15 and causes its free end to be deflected upwardly, opening valve 13, 14.

An electric igniter coil 32 is also connected with the conductor 20 at one end, and at its other end by a conductor 33 with the lower contact 34 of the two-way switch. The moving blade 35 of this switch is adapted to engage either one of the contacts 26 and 34, its opposite end being mounted upon a support 36. From switch blade 35 conductors 37, 38 and 39 extend to a contact 40 spaced a short distance above the normal position of the bi-metal strip 15. However, when the latter is warped sufficiently by the heat from coil 28 it engages the contact 40, following the opening of valve 13, 14 and, assuming that the switch blade 35 is down upon contact 34, completes a circuit from the transformer through conductor 20, igniter coil 32, conductor 33, contact 34, switch blade 35, conductors 37, 38 and 39, contact 40, bi-metal strip 15 and conductors 30 and 31 back to the transformer.

If gas is then flowing through the pilot pipe it will be ignited by the energized coil 32. The pilot flame then strikes against a heat responsive element comprising a short arm 41 pivoted at 42 to a support and at its other extremity to the upper end of a lever 43, the latter being pivoted to a support at 44. The lower extremity of this lever is in turn pivoted to a longitudinally slidable rod or bar 45 which carries at its opposite end a cam block 46 that is arranged to engage a depending projection on the switch blade 35 and thereby to raise that blade when the parts 41 and 43 expand, due to the action of the heat from the pilot flame, and move the rod 45 longitudinally. In this manner the switch blade is caused to leave lower contact 34 and to engage upper contact 26.

When the second control switch has been shifted to its upper or closed position as just described, a circuit is completed through the valve motor 24, that is by way of conductor 20, contact 22, thermostat 21, conductor 23, motor 24, conductor 25, contact 26, switch blade 35, conductors 37, 38 and 39, contact 40, bi-metal strip 15, and conductors 30 and 31 back to the transformer. The valve 11 is thereby opened, and gas is permitted to flow to the main burner where it is ignited by the pilot flame.

Gas continues to flow to the main burner until the call for heat is satisfied, whereupon the thermostatic or first control switch 21, 22 opens, thereby deenergizing motor 24 and causing the gas to be turned off immediately. At the same time the circuit through heating coil 28 is broken at the thermostat, and the bi-metal strip 15 begins to cool. This will shortly cause a second break in the valve motor line, that is between the contact 40 and the bi-metal strip 15, and somewhat later will cause pilot valve 14 to approach its seat 13, whereupon the pilot flame will die down and go out. When this occurs the heat responsive elements 41 and 43 begin to cool, thereby gradually moving rod 45 to the right and permitting switch blade 35 to drop away from contact 26. The circuit through the valve motor is then broken in three places, that is at the first control switch 21, 22, at the bi-metal switch 15, 40, and at the second control switch 35, 26.

Now, in order to prevent the opening of the main valve after the pilot has gone out or been throttled down to such an extent as to be unsafe, and before the switch blade 35 has left contact 26, even though the thermostatic switch 21, 22 be closed by manual or other means, I have devised that part of the system which will now be described.

In parallel with the heating coil 28 I arrange a relay solenoid 47, connected by conductors 48 and 49 to conductors 27 and 30, respectively. The armature of this relay carries two conductors 50 and 51, having feet which are adapted to engage contacts 52 and 53 in conductors 54 and 55, respectively. The energization of the coil 47 breaks the connection of these contacts with the conductors 50 and 51. When the coil is deenergized the armature of the solenoid falls and electrical connections are made with contacts 52 and 53. Conductors 54 and 55 are connected with terminals 56 and 57 of a two-pole, two-way switch 58, having two other terminals 59 and 60, the latter one of which is idle. One arm of switch 58 is connected by a conductor 61 with conductor 37, while the other arm of the switch is connected by a conductor 62 with conductor 25. Above the relay, conductor 50 is connected by a flexible wire 63 and a conductor 64 to conductor 20. The other armature conductor 51 is connected by a flexible wire 65 with a conductor 66 which leads to conductor 31. Thus it will be observed that when switch blade 35 is in its upper position in engagement with contact 26, and the armature or relay 47 is down, a shunt circuit is set up, that is from conductor 20 through conductors 64, 63 and 50, contact 52, conductor 54, one arm of switch 58, conductors 61 and 37 to switch blade 35, through that blade and contact 26 and through conductors 25 and 62 to the other arm of switch 58, through conductor 55, contact 53 and conductors 51, 65 and 66 back to conductor 31 and the transformer. This shunt circuit should contain an appreciable resistance, and as indicative of such resistance I have placed a resistance coil 67 in the conductor 64. In some cases, however, the resistance inherent in the shunt circuit will be sufficient without the introduction of the coil 67. In any event the resistance in the shunt should be so proportioned with respect to the other parts of the system that it will provide a relatively easy current path through the shunt and leave insufficient current to operate valve motor 24 as well as insufficient current to operate relay coil 47. The heating coil 28, however, if the thermostat be closed, will be energized to an extent sufficient to maintain valve 13, 14 open to a small extent. In practice I prefer to have the supply to the pilot at such times about one-third of the normal flow of fuel thereto. Therefore, when the shunt circuit is closed the valve motor 24 is unable to operate valve 11 and the pilot is throttled down.

In the off cycle, that is when the thermostatic or first control switch 21, 22 opens following a period of burner operation, the circuit through relay coil 47 is immediately broken, and the armature 50 is permitted to drop, bridging contacts 52 and 53. The shunt circuit previously described is therefore immediately set up, and it can be broken again only at the switch 26, 35, since the relay coil 47 is not able to function so long as the shunt circuit remains effective. Hence, after the thermostat ceases to call for heat it is impossible to again open the main valve 11 until the pilot has gone out or died down and the heat responsive elements 41 and 43 have cooled and permitted the switch blade 35 to come away from its upper contact 26. The manual closing of the thermostatic switch 21, 22, or its closing by any other means such for example as by the sudden opening of the doors and windows of the room in which it is located, during the off cycle, cannot cause the operation of the valve motor until the system is in condition to insure the lighting of fuel at the burner.

As soon as the cooling of the thermostatic elements in the starting apparatus causes the second control switch 26, 35 to open, thereby breaking the shunt circuit, the relay coil 47 again becomes effective, assuming that the thermostatic switch 21, 22 is closed, and the shunt circuit is broken at the contacts 52, 53. If then the thermostat is thus again closed within a predetermined short space of time the apparatus is ready to do either one of two things. First, if the pilot flame has not gone out entirely, that flame will increase until it reaches full size when the switch 35, 26 will be closed and the fuel to the main burner turned on and ignited; or second, if the pilot has gone out then the system will function as it does in every complete lighting cycle, including the steps of opening the pilot valve, energizing the igniter coil and thereby lighting the pilot, heating up the heat responsive elements 41, 43, pushing switch blade 35 up to cause engagement with contact 26 and thereby energizing valve motor 24 and turning on the fuel to the main burner. The first procedure will take place only when the thermostat switch after being opened is suddenly closed again before the pilot flame has been extinguished by the gradual cooling of the coil 28, the bi-metal element and the atmosphere surrounding it. As previously stated the shunt circuit does not completely de-energize coil 28, but merely reduces its heating power. The pilot then continues to burn with a low flame which is not of sufficient heating effect to maintain the elements 41 and 43 expanded. Consequently they cool gradually and presently slide bar 45 recedes sufficiently to lower switch blade 35 somewhat, thereby breaking its connection with contact 26. The shunt circuit is therefore broken immediately, valve motor 24 is again put into condition to function and relay coil 47 is also put into condition to function. With the load of the shunt circuit taken from the line, full current flows through coil 28 and the bimetal element 15 heats up to fully open the pilot valve 13, 14, so that the pilot flame again builds up to normal and the heat responsive elements 41 and 43 are actuated to close switch 35, 26, opening valve 11. The main burner is therefore again turned on and ignited without going through the pilot lighting cycle.

I prefer to employ intermittent energization or "blinking" of the igniter coil 32 in the manner described in my copending application, Serial No. 136,847, filed April 14, 1937, but that method of operation per se forms no part of the present invention.

In accordance with the preferred form of the invention I utilize the shunt circuit above referred to, for the further purpose of providing a safety control in the event of failure of gas pressure. To this end I may connect with the main fuel line anywhere on the intake side of the valve 11, or with the pilot pipe 12, a casing 68 preferably of Bakelite or other insulating material, in which is mounted a diaphragm 69 that is exposed to the pressure in the line. This diaphragm carries an electric contact 70, joined by a conductor 71 with the conductor 48 on one side of a break in that conductor. A second contact 72 mounted on the casing is connected by a conductor 73 with relay coil 47 on the opposite side of the break therein. The parts are so arranged and adjusted that normal gas pressure in the fuel line presses contact 70 against contact 72, but in case the pressure falls below a safe operating pressure the contacts separate and the relay coil 47 is de-energized, permitting the armature 50, 51 to fall and close the shunt circuit, whereupon the main valve is closed until such time as the correct gas pressure is resumed. In this case also the main burner will be turned on without going through the pilot lighting cycle if the interruption of gas pressure is too short to cause the pilot to be extinguished entirely. Otherwise the full pilot lighting cycle will precede the turning on of the main valve.

Under some circumstances it becomes desirable to operate the system with a continuously burning pilot functioning to turn off the main gas burner in case the pilot goes out, instead of operating it with a normally out and automatically ignited pilot. The switch 58 combined with a by-pass around pilot valve 13, 14 provides means for readily making this change. To this end switch terminal 59 is joined by means of a conductor 74 with the conductor 31 on the return side of the transformer. Also there is provided a by-pass connection indicated at 75 in Fig. 1 which extends around the pilot valve 13, 14 together with a manual valve 76 which is closed for automatic operation of the system and opened for operation with a continuously burning pilot. When the change-over is to be made the switch 58 is thrown to the left so that its two arms make contact respectively with the terminals 59 and 60. The disabling shunt is thereby thrown out of the circuit, as is also the heating coil 28 and its associated parts. Since pilot 18 then burns continuously, heat responsive elements 41 and 43 are continuously expanded to hold switch 35, 26 closed. Hence, when the thermostat calls for heat, valve motor 24 is immediately energized and the burner turned on and lighted. In the event that the pilot should go out, however, the circuit would be broken at switch 35, 26 and the main burner could not be turned on again until the difficulty was cured.

In Figs. 2 and 3 I have illustrated somewhat in detail one suitable form of pilot valve and pilot by-pass. In these figures there is indicated at 120 a passage which is similar in function to the passage 12 of Fig. 1 and is intended to receive fluid fuel from the fuel line ahead of the main valve. The valve 140 in this case is a flat valve adapted to engage the seat 130, these parts being located in a cavity 75 in the casing 170, which cavity is closed by a diaphragm 76 in the center of which the valve piece 140 is mounted. A coil spring 77 tends to open the valve. Bimetal element 15 is so formed and adjusted that it normally exerts through a button 78 downward pressure sufficiently in excess of the upward pressure exerted by spring 77 to hold the valve closed. When coil 28 is energized the bi-metal element is warped to relieve the valve of this downward pressure and permit spring 77 to open it, further warping of the valve serving to press a metal button 79 on the bi-metal element against contact 40.

From one side of the cavity 75 a passage 80 extends laterally into a boss 81 which contains provision for attachment to pilot pipe 18. The by-pass 175 is under control of a needle valve 176. When the latter is threaded upwardly the by-pass is opened and when it is threaded downwardly against its seat the by-pass is closed.

Having thus described my invention, I claim:

1. In control apparatus for fluid fuel burners, a fuel line, a main valve therein, an electric motor for opening said valve, a circuit for said motor comprising a source of current, a first control switch and a second control switch, means adapted to open the second control switch at the end of a predetermined time interval following the opening of the first control switch, a parallel circuit including said second control switch adapted to reduce the electrical energy available to said valve motor below that necessary to actuate the motor, a switch in said parallel circuit, and means functioning during the normal operation of the burner for maintaining said last named switch open, said means being incapacitated by and during the energization of the parallel circuit.

2. In control apparatus for fluid fuel burners, a fuel line, a main valve therein, an electric motor for opening said valve, a circuit for said motor comprising a source of current, a first control switch and a second control switch, means adapted to open the second control switch at the end of a predetermined time interval following the opening of the first control switch, a parallel circuit including said second control switch adapted to reduce the electrical energy available to said valve motor below that necessary to actuate the motor, a switch in said parallel circuit, and means functioning during the normal operation of the burner for maintaining said last named switch open, said last named means being disabled by the opening of said first switch.

3. In control apparatus for fluid fuel burners, a fuel line, a main valve therein, an electric motor for opening said valve, a circuit for said motor comprising a source of current, a first control switch and a second control switch, means adapted to open the second control switch at the end of a predetermined time interval following the opening of the first control switch, a parallel circuit also including said second control switch and comprising sufficient resistance to reduce the electrical energy available to said valve motor below that necessary to actuate the motor, a switch in said parallel circuit, and electrical means drawing current from said source and functioning during the normal operation of the burner for maintaining said last named switch open, the load impressed upon said current source by the resistance in said parallel circuit when that circuit is closed being sufficient to incapacitate said electrical means, whereby said parallel circuit when once established may be opened only by said second control switch.

4. In combination with a fluid fuel burner, a main valve, a normally out pilot, an electric igniter therefor, a first control switch and a second control switch, eelctrical means functioning when said first control switch closes for setting in operation a starting cycle comprising turning on the pilot, energizing the electric igniter and closing said second control switch, a valve motor arranged to be actuated when said second control switch closes, a shunt circuit around said valve motor arranged to be completed after a period of burner operation when said first switch opens, said shunt circuit being adapted to incapacitate said valve motor and requiring the opening of said second switch before the valve motor may again be operated.

5. In a control system for fluid fuel burners, a master thermostat, a fuel line to the main burner, a valve therein, an electric motor for opening said valve, an electric circuit therefor, a normally out pilot, heat responsive means associated with said pilot, an electric igniter for said pilot, electrical means under control of said thermostat for turning on said pilot and energizing said igniter, a shunt circuit adapted when closed to disable said valve motor and throttle down said pilot, means controlled by said thermostat for completing said shunt circuit when said thermostat ceases to call for heat, and means controlled by said heat responsive means for deenergizing said shunt circuit when the pilot flame is throttled down to a predetermined extent.

6. In control apparatus for fluid fuel burners, a fuel line, a main valve therein, an electric motor for opening said valve, a circuit for said motor comprising a source of current, a first control switch and a second control switch, means adapted to open the second control switch at the end of a predetermined time interval following the opening of the first control switch, and a shunt circuit around said valve motor effective upon the opening of said first control switch for disabling said valve motor during the time interval required to open said second control switch after the opening of said first control switch.

7. In control apparatus for fluid fuel burners, a fuel line, a main valve therein, an electric motor for opening said valve, a circuit for said motor comprising a source of current, a first control switch and a second control switch, means adapted to open the second control switch at the end of a predetermined time interval following the opening of the first control switch, and a shunt circuit around said valve motor effective upon the opening of said first control switch for reducing the electrical energy which it is possible to impress upon said valve motor during the time interval required to open said second switch, whereby the valve motor is prevented from turning on the fuel to the burner during that interval even though said first control switch may be again closed during that interval.

8. In control apparatus for fluid fuel burners, a fuel line, a main valve therein, an electric motor for opening said valve, a circuit for said motor comprising a source of current, a first control switch and a second control switch, means adapted to open the second control switch at the end of a predetermined time interval following the opening of the first control switch, a shunt circuit around said valve motor, a switch in said shunt circuit, and means effective upon the opening of said first control switch for closing said shunt circuit switch, said shunt circuit when completed being adapted to disable said valve motor.

9. In control apparatus for fluid fuel burners, a fuel line, a main valve therein, an electric motor for opening said valve, a circuit for said motor comprising a source of current, a first control switch and a second control switch, means adapted to open the second control switch at the end of a predetermined time interval following the opening of the first control switch, a shunt circuit around said valve motor, a switch in said shunt circuit, means effective upon the closing of said first control switch for opening said shunt circuit switch and upon the opening of said first control switch for closing said shunt circuit switch, said shunt circuit when completed being adapted to disable said valve motor.

10. In control apparatus for gas burners, a gas line, a main valve therein, an electric motor for opening said valve, an electric circuit through said motor comprising a source of current, a first control switch and a second control switch, a pilot, thermostatic means dependent upon pilot operation for maintaining said second switch closed and said main valve open so long as said first control switch remains closed, electrical means for turning off said pilot dependent upon the opening of said first control switch whereby the cooling of said pilot thermostatic means causes the opening of said second control switch, and means comprising a shunt circuit around said valve motor effective upon the opening of said first control switch for reducing the electrical energy which it is possible to impress upon said valve motor during the time interval required to open said second switch, whereby the valve motor is prevented from turning on the fuel to the burner during that interval.

VILYNN O. BEAM.